United States Patent
Beer et al.

(10) Patent No.: US 8,197,608 B2
(45) Date of Patent: Jun. 12, 2012

(54) DISHWASHER FEATURING ALTERNATING PUMP OPERATION

(75) Inventors: Hans Beer, Medlingen (DE); Roland Rieger, Rainau (DE); Christian Wolf, New Bern, NC (US)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1048 days.

(21) Appl. No.: 10/583,695

(22) PCT Filed: Dec. 13, 2004

(86) PCT No.: PCT/EP2004/053428
§ 371 (c)(1),
(2), (4) Date: Sep. 18, 2008

(87) PCT Pub. No.: WO2005/063108
PCT Pub. Date: Jul. 14, 2005

(65) Prior Publication Data
US 2009/0032061 A1     Feb. 5, 2009

(30) Foreign Application Priority Data

Dec. 23, 2003  (DE) .................................. 103 60 905
Jan. 27, 2004  (DE) ........................... 10 2004 004 104

(51) Int. Cl.
*B08B 7/04* (2006.01)
(52) U.S. Cl. ......................................... 134/18; 134/25.2
(58) Field of Classification Search ........................ None
See application file for complete search history.

(56) References Cited

U.S. PATENT DOCUMENTS

| | | | |
|---|---|---|---|
| 4,038,103 | A | 7/1977 | Grunewald |
| 2001/0017145 | A1 | 8/2001 | Rosenbauer et al. |
| 2005/0011546 | A1 | 1/2005 | Ertle et al. |

FOREIGN PATENT DOCUMENTS

| | | |
|---|---|---|
| DE | 2013716 A1 | 10/1971 |
| DE | 2823493 A1 | 12/1979 |
| DE | 2848375 A1 | 5/1980 |
| DE | 3021755 A1 | 12/1981 |
| EP | 0 237 994 | 9/1987 |
| EP | 0 930 044 | 7/1999 |
| EP | 0 998 872 | 5/2000 |

OTHER PUBLICATIONS

EPO machine translation of DE2013716 Retrieved from http://translationportal.epo.org/emtp/translate/?ACTION=descriptionretrieval&COUNTRY=DE&FORMAT=docdb&KIND=A1&LOCALE=en_EP&NUMBER=2013716&OPS=ops.epo.org&TRGLANG=en&ENGINE=google&SRCLANG=deon Oct. 7, 2011.*
International Search Report PCT/EP2004/053428.

* cited by examiner

*Primary Examiner* — Michael Kornakov
*Assistant Examiner* — Eric Golightly
(74) *Attorney, Agent, or Firm* — James E. Howard; Andre Pallapies

(57) ABSTRACT

A method for operating a dishwasher is provided, in which the dishwasher includes at least one washing container, a re-circulation pump for conveying washing fluid to at least one spray device for acting upon items to be cleaned, which are located in the washing container, a lye pump for pumping away washing liquid from the dishwasher. The method includes executing a wash program at least including partial program steps pre-wash ($V_1, V_2$), clean ($R_1, R_2$), intermediate rinse, clear rinse ($K_1, K_2$) and dry, and operating the re-circulation pump and the lye pump at least temporarily in an alternating manner during at least one of the partial program steps ($V_1, V_2, R_1, R_2, K_1, K_2$).

28 Claims, 4 Drawing Sheets

DISHWASHER FEATURING ALTERNATING PUMP OPERATION

The invention relates to a method for operating a dishwasher comprising at least one washing container, a recirculation pump for conveying washing liquid to at least one spray device for acting upon items to be cleaned, which are located in the washing container, a lye pump for pumping away washing liquid from the dishwasher and comprising a wash program at least composed of the partial program steps prewash, clean, intermediate rinse, clear rinse and dry. The invention is further directed towards a dishwasher wherein a method featuring alternating pump operation is provided for application.

BACKGROUND OF THE INVENTION

Dishwashers usually have at least one washing container and spray devices located therein, wherein the spray devices are loaded with liquid conveyed by a recirculation pump in order to act upon items to be washed in the washing container with washing fluid. In the known dishwashers, a plurality of wash programs composed of the partial program steps prewash, clean, intermediate rinse, clear rinse and dry can usually be selected by means of a program controller. Since the washing fluid accumulates washing residues during the cleaning phases, filter systems are provided in the water circuit of the dishwasher through which washing water circulated by the recirculation pump is passed continuously.

The known dishwashers have the disadvantage that the filter systems can become clogged with washing residues in the course of the washing program. This results in back-contamination of the items to be washed as a result of size reduction and fine distribution of the washing residues deposited at the filter systems and thus reduces the cleaning effect of the dishwasher. Obstructions can also occur in the washing liquid circuit, whereby the cleaning function of the filter systems is impaired. Another disadvantage is that as a result of the obstructions in the washing liquid circuit and the lengthening of the wash program, the energy consumption of the dishwasher required to achieve a satisfactory cleaning result is increased.

SUMMARY OF THE INVENTION

It is thus the object of the present invention to provide a method whereby a dishwasher can be operated such that washing residues that accumulate during the cleaning phases are removed from the washing liquid early on and the dishwasher filter systems are automatically cleaned before the filter systems can be overloaded. It is further the object of the present invention to configure the washing program sequence of a dishwasher such that the greatest possible saving in energy required for operation of the dishwasher can be achieved with optimal washing performance.

This object is achieved by the method according to the invention for operating a dishwasher having the features of the embodiments described herein or by the dishwasher according to the invention according to the embodiments described herein.

The present invention provides a method for operating a dishwasher comprising at least one washing container, a recirculation pump for conveying washing liquid to at least one spray device for acting upon items to be cleaned, which are located in the washing container, a lye pump for pumping away washing liquid from the dishwasher and comprising a wash program at least composed of the partial program steps pre-wash, clean, intermediate rinse, clear rinse and dry, wherein the recirculation pump and the lye pump are operated at least temporarily in an alternating manner during at least one part program step.

The method according to the invention allows washing residues that accumulate during the cleaning phases of the wash program to be removed from the washing liquid early on and carried away from the dishwasher. As will be described in detail hereinafter, the dishwasher filter systems are automatically cleaned before the filter systems can be overloaded. In this way, the cleaning performance of the dishwasher can be improved and the total run time of the wash program can therefore be reduced. A further advantage of the present invention is that by avoiding impairments in the washing liquid circuit and reducing the total run time of the wash program, the greatest possible saving in energy required for operation of the dishwasher can be achieved with optimal washing performance.

During washing operation, the washing liquid is conveyed by the recirculation pump to the spray devices in the dishwasher to produce water jets for cleaning the items to be washed. The washing liquid then flows in the direction of circulation through a filter where washing residues entrained in the washing liquid deposit on the filter surfaces of the filter system. During a pumping-out process wherein the washing liquid is conveyed from the dishwasher via the lye pump, the direction of flow of the washing liquid in the filter system is opposite to the direction of circulation and the washing liquid flows through the filter surfaces of the filter system in the opposite direction. The deposited washing residues are thereby released from the filter surfaces and pumped away with the used washing liquid via the lye pump. In this way, the filter system is cleaned and its filter function restored. Consequently, in the method according to the invention as a result of the alternating operation between the recirculation pump and the lye pump during a part program step, on the one hand the quantity of washing residues in the filter system is effectively reduced and on the other hand the energy expenditure required for the washing operation is kept as low as possible.

In a preferred embodiment of the present invention, the recirculation pump and the lye pump are operated simultaneously at least temporarily during a part program step. This means that the recirculation pump is operated at least temporarily during the pumping away of washing fluid from the dishwasher. As a result of the operation of the recirculation pump and therefore the spray devices, firstly the washing residues distributed in the dishwasher are carried together in the dishwasher sump and collected by the filter system. Secondly, the filter system is cleaned by the operation of the lye pump and the washing residues are conveyed from the dishwasher via the lye pump.

In the method according to the invention, it can also be provided that fresh water is supplied at least temporarily to the washing liquid circuit during a part program step by opening a feed valve. The feed valve for supplying fresh water can also be opened at least temporarily during operation of the recirculation pump. This can prevent the quantity of washing liquid from becoming too low in the course of the part program step or the concentration of washing residues in the washing liquid becoming too high. In a further embodiment of the method according to the invention, the feed valve is opened at least temporarily during operation of the lye pump to admit fresh water into the dishwasher. In this way, an additional flushing for cleaning the filter system can be carried out if required whilst pumping away the washing liquid.

It is also advantageous if washing liquid is pumped out of the dishwasher via the lye pump not only at the end of a part program step but also during a part program step. The filter system can thus be cleaned during a part program step, the quantity of washing residues contained in the washing liquid can be reduced and the risk of back-contamination of the items to be washed or blockage of the filter system can be counteracted.

The dishwasher can also be operated by the method according to the invention such that the recirculation pump is operated at least temporarily during the admission into the dishwasher of the washing liquid used for a part program step, especially the pre-wash process or the clear rinse process. During the admission of washing liquid into the dishwasher, the washing liquid required for a washing process is not yet completely introduced into the dishwasher, which means that the liquid level of the washing liquid is still at a low level. This has the result that during admission of the washing liquid into the dishwasher, in addition to the washing liquid the recirculation pump also draws in some air and consequently conveys a smaller volume of washing liquid than that conveyed when the liquid level of the washing liquid in the dishwasher is at a higher or maximum level. The reduced conveying capacity of the recirculation pump again has the consequence that the water jet acting on the items to be washed through the spray device is less intensive and the release of food residues from the items to be washed is distributed over a longer time, whereby overloading of the filter systems can be avoided.

A similar effect can be achieved if the quantity of washing liquid used for a part program step is successively reduced during the relevant part program step. As a result of the effect described above whereby, when the level of the washing liquid in the dishwasher is low, in addition to the washing liquid the recirculation pump also draws in some air and consequently conveys a smaller volume of washing liquid, the conveying capacity of the recirculation pump and therefore the intensity of the water jet produced by the recirculation pump via the spray devices can be varied in a simple manner as the washing liquid level in the dishwasher varies. As a result of the alternating operation of the recirculation pump and the lye pump by the method according to the invention without any intermediate supply of fresh water until the washing liquid is substantially completely pumped away from the dishwasher, it can be ensured that the washing residues accumulated during the part program step are substantially completely conveyed from the dishwasher before the next part program step of the wash program or a new wash program begins.

The washing liquid level in the dishwasher can be varied, for example, by supplying fresh water which increases the washing liquid level. The lye pump for pumping away washing liquid from the dishwasher is preferably operated at least temporarily during a part program step to reduce the washing liquid level. For this purpose, in the course of a part program step the lye pump can either be operated at intervals or continuously and until the washing liquid is substantially completely pumped out of the dishwasher so that at the end of the respective part program step, substantially no more washing liquid is present in the dishwasher. In this way, the washing residues accumulated during a part program step are conveyed from the dishwasher during the relevant part program step. A particularly good washing result can thus be achieved if the washing liquid is substantially completely changed after each part program step using washing liquid.

In a further preferred embodiment of the present invention, the speed and therefore the capacity of the recirculation pump for conveying washing liquid can be varied. For this purpose the electrical recirculation pump is supplied, for example, with a driving current of different power so that recirculation pump accordingly produces different speeds. This has the consequence that the recirculation pump conveys different quantities of washing liquid to the spray device and thus the intensity of the water jet acting on the items to be washed by the spray devices can be varied.

With this preferred embodiment of the method according to the invention, at the beginning of the pre-wash phase for example, the recirculation pump can be operated at low speed so that the water jet acting on the items to be washed by the spray device has a lower intensity. As a result, the release of food residues from the items to be washed particularly during the pre-wash phase is distributed over a longer time interval since peak occurrences of washing residues in the washing liquid are reduced or flattened so that the filter systems in the dishwasher are not overloaded. It may also be desirable to produce a lower-intensity water jet acting on the items to be washed during the clear rinse process since in this case, the items should only be wetted with clear rinse agents.

BRIEF DESCRIPTION OF THE DRAWINGS

The invention is explained in detail hereinafter using preferred exemplary embodiments with reference to the appended drawings. In the figures.

DETAILED DESCRIPTION OF THE EXEMPLARY EMBODIMENTS OF THE PRESENT INVENTION

Figure 1:
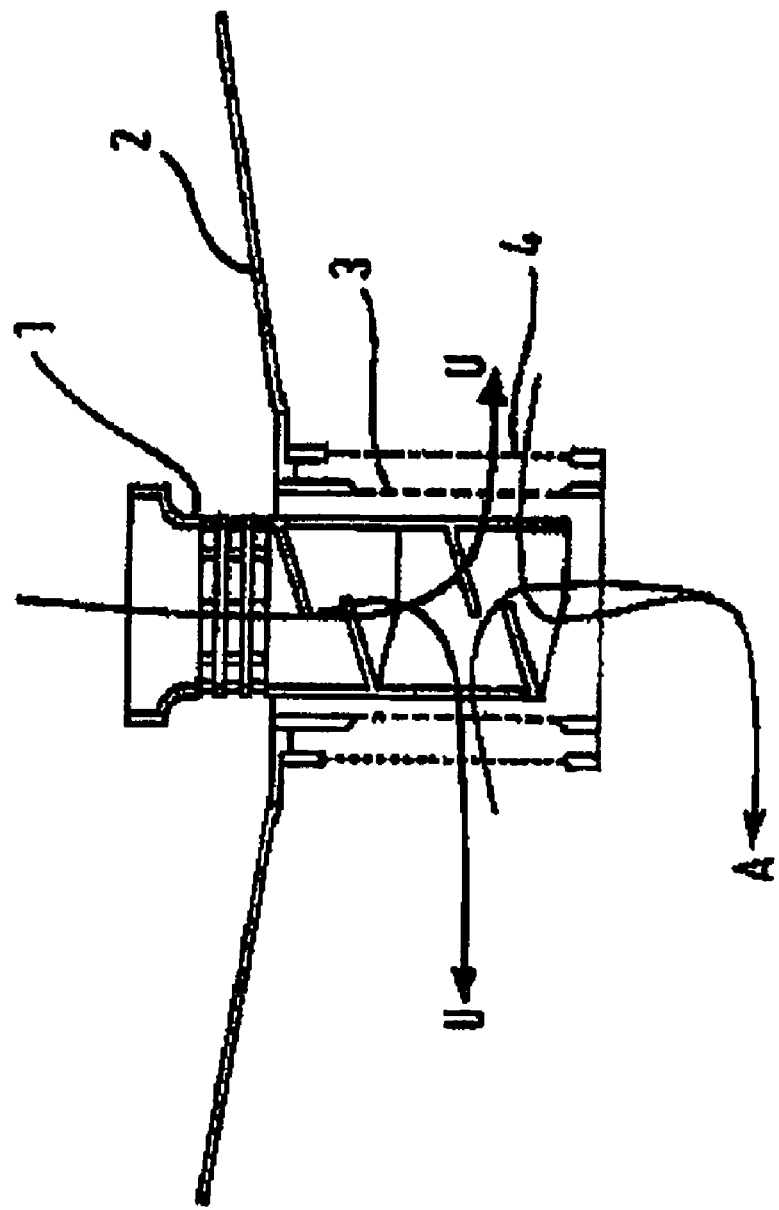
FIG. 1 is a sectional view of a filter system such as that used for cleaning washing liquid in a dishwasher according to the prior art.

The filter system shown in FIG. 1 comprises a substantially cylindrical coarse filter 1 and a flat fine filter 2 which is disposed around the upper portion of the cylindrical coarse filter 1 in the manner of a collar. The lower portion of the coarse filter 1 is surrounded by a fine filter cylinder 3 and this is surrounded by a micro-filter cylinder 4. Such a filter system for cleaning the washing liquid is usually located in the lower part of the washing container (not shown) above the dishwasher sump and frequently forms the bottom of the washing container.

During washing operation, the washing liquid is conveyed by the recirculation pump in the dishwasher to the spray devices to produce water jets for cleaning the items to be washed. The washing liquid collects at the bottom of the washing container, flows in the direction of circulation U over the fine filter 2 into the interior of the cylindrical coarse filter 1 and then through the filter surfaces of the fine filter cylinder 3 and the micro-cylinder 4 back outside into the sump of the dishwasher. In this case, washing residues entrained in the washing liquid deposit on the inner sides of the cylindrical filter surfaces of the individual filters 1, 3, 4. During the pumping-away process when the washing liquid is conveyed out of the dishwasher by means of the lye pump, the direction of flow A of the washing liquid in the filter system is opposite to the direction of circulation U and the washing liquid flows from outside through the filter surfaces of the micro-cylinder 4, the fine filter cylinder 3 and the coarse cylinder 1 into the interior of the cylindrical filter system and is pumped away from there through an opening in the lower part of the filter system by the lye pump. At the same time, the deposited washing residues are released from the filter surfaces and conveyed together with the used washing liquid from the dishwasher by means of the lye pump. The filter system is thereby cleaned and its filter function restored.

According to the method according to the invention, as a result of the alternating operation between recirculation pump and lye pump during a part program step, the system alternates between circulating operation and pumping out. As a result, during circulating operation on the one hand, the quantity of washing residues in the washing liquid is reduced by the filter function of the filter system and on the other hand, during pumping out still during a part program step, the filter system is cleaned and washing residues are conveyed from the dishwasher.

Figure 2:
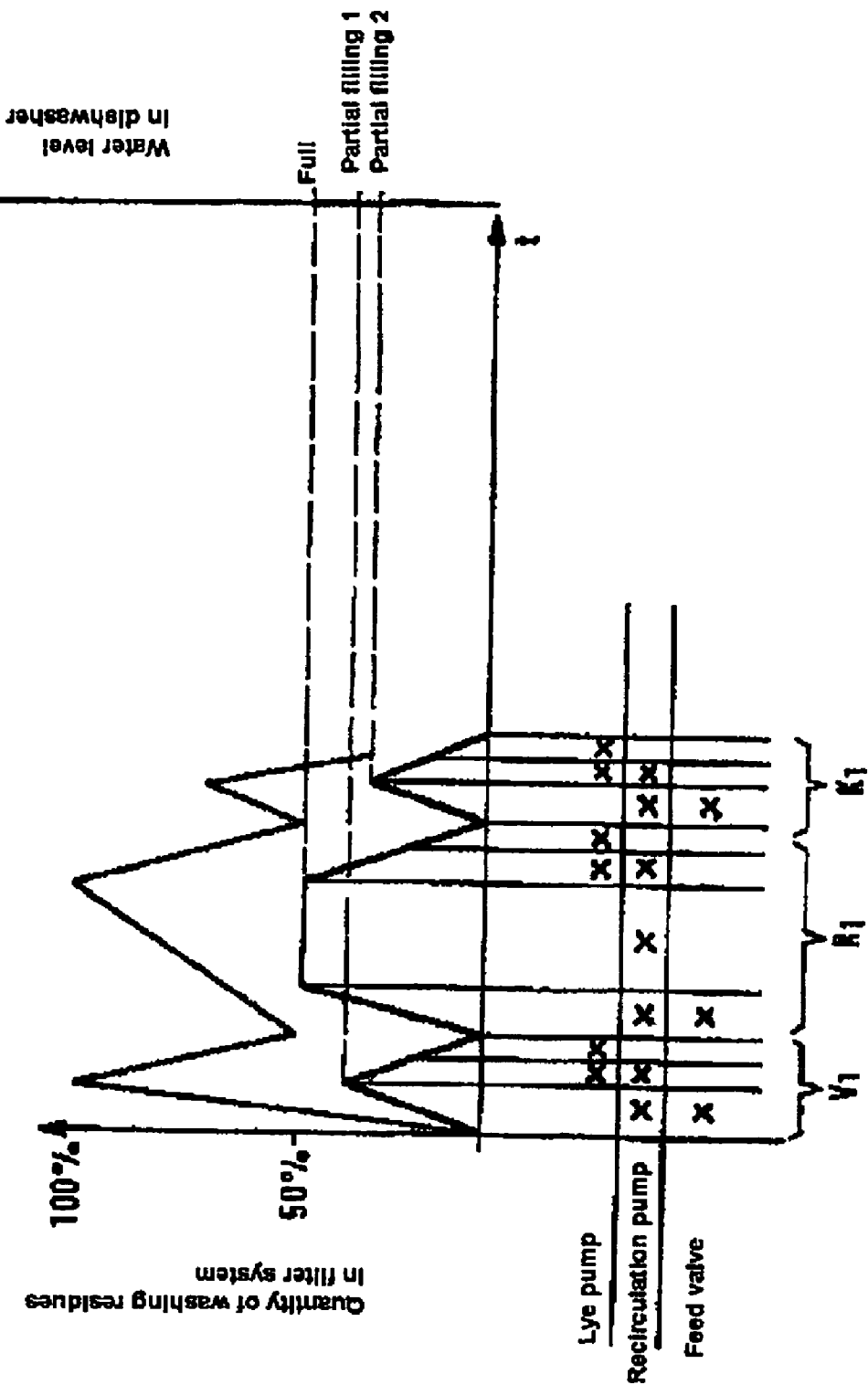
FIG. 2 is a diagram showing the occurrence of washing residues in the filter system in relation to the filling level of the washing liquid in the dishwasher, the operation of the lye pump, the recirculation pump and the feed valve in a method for operating dishwasher according to the present invention according to a first preferred embodiment.

FIG. 2 is a diagram showing the occurrence of washing residues in the filter system in relation to the filling level of the washing liquid in the dishwasher, the operation of the lye pump, the recirculation pump and the feed valve in a method for operating dishwasher according to the present invention according to a first preferred embodiment. In the diagram in FIG. 2 the time t is plotted on the X axis and the quantity of washing residues in the washing liquid from 0% to 100% is plotted on the Y axis. The diagram in FIG. 2 contains a first curve which shows the time behaviour of the filling level of the washing liquid in the dishwasher and a second curve which shows the time behaviour of the quantity of washing residues in the filter system in the course of the washing program of a dishwasher according to the present invention according to a first preferred embodiment.

The wash program in this embodiment comprises three part program steps, such as pre-wash $V_1$, clean $R_1$ and clear rinse $K_1$, the individual part program steps $V_1$, $R_1$, $K_1$, being subdivided into a plurality of subsections by vertical lines. In the course of the part program steps $V_1$, $R_1$, $K_1$, the lye pump, recirculation pump and feed valve of the dishwasher can be activated or opened or deactivated or closed according to the program sequence. The operation of the lye pump, the recirculation pump and the feed valve is indicated in each case by crosses (X) in a matrix in the lower part of the diagram which is formed by the perpendicular lines for subdividing the subsections of the part program steps $V_1$, $R_1$, $K_1$, and the horizontal lines for distinguishing the operation of the lye pump, the recirculation pump and the feed valve. A cross in the lye pump line indicates operation of the lye pump and therefore pumping out within the relevant subsection of the part program step $V_1$, $R_1$, $K_1$. A cross in the recirculation pump line indicates operation of the recirculation pump and therefore circulation within the relevant subsection of the part program step $V_1$, $R_1$, $K_1$. A cross in the feed valve line indicates that the feed valve is open and thus fresh water is supplied to the dishwasher during the relevant subsection of the part program step $V_1$, $R_1$, $K_1$, the feed valve being closed at all other times and no fresh water being supplied.

As can be seen from FIG. 2, the method for operating a dishwasher according to a first preferred embodiment of the invention begins with the part program step pre-wash $V_1$, and simultaneous operation of the recirculation pump and the feed valve and the successive admission of washing liquid into the dishwasher. Likewise, the part program steps clean $R_1$ and clear rinse $K_1$ begin with the simultaneous operation of the recirculation pump and the feed valve and the successive admission of washing liquid into the dishwasher That is, the dishwasher is operated so that the recirculation pump is operated at least temporarily during the admission of the washing liquid used for the pre-wash process, the cleaning process $R_1$ or the clear rinse process $K_1$.

During the admission of washing liquid into the dishwasher, the washing liquid required for a part program step $V_1$, $R_1$, $K_1$ is not yet completely introduced into the dishwasher, which means that the liquid level of the washing liquid is still at a low level. This has the result that during admission of the washing liquid into the dishwasher, in addition to the washing liquid the recirculation pump also draws in some air and consequently conveys a smaller volume of washing liquid than that conveyed when the liquid level of the washing liquid in the dishwasher is at a higher or maximum level. The reduced conveying capacity of the recirculation pump again has the consequence that the water jet acting on the items to be washed through the spray device is less intensive and the release of food residues from the items to be washed is distributed over a longer time, whereby overloading of the filter systems can be avoided. This effect is intensified if the filling level of the washing liquid in the dishwasher only goes as far as a partial filling 1 during the pre-wash process $V_1$ and only as far as a partial filling 2 during the clear rinse process $K_1$, the partial filling 1 corresponding to about 70-80% of the maximum filling level of the washing liquid in the dishwasher and the partial filling 2 corresponding to about 60-70% of the maximum filling level of the washing liquid in the dishwasher.

At the beginning of each part program step $V_1$, $R_1$, $K_1$ using washing liquid, the washing residues are released relatively rapidly from the items to be washed, resulting in an increase in the quantity of washing residues in the washing liquid and in the filter system. In the further course of the wash program the lye pump and the recirculation pump are at least temporarily activated at the same time. This means that during circulating operation some of the washing liquid is removed from the filter system and conveyed from the dishwasher. As a result of the operation of the recirculation pump and therefore the spray device, firstly washing residues distributed in the dishwasher are removed from the filter system and carried together in the dishwasher sump. At the same time, the filter arrangement is cleaned by operation of the lye pump and the washing residues are conveyed from the dishwasher by means of the lye pump. As a result, the accumulated washing residues are removed from the washing liquid early on during the cleaning phases $V_1$, $R_1$, $K_1$ and are carried away from the dishwasher. This effect is shown by the curve giving the quantity of washing residues in the washing liquid which in each case descends in the last part of a part program step $V_1$, $R_1$, $K_1$. As described above, the dishwasher filter system is thereby automatically cleaned before the filter systems can become overloaded.

In another subsection of the part program step clean $R_1$ only the recirculation pump is operating. In the part program step clean $R_1$ the dishwasher is filled with washing liquid up to the maximum filling level (full). This means that during the main cleaning phase apart from the initial and final phase of the part program step clean $R_1$, pure circulating operation takes place with the recirculation pump at full capacity. In the respectively last subsection of a part program step $V_1$, $R_1$, $K_1$ only the lye pump is activated since the used washing liquid is preferably completely removed from the dishwasher in this subsection of the wash program.

Since the lye pump operates during a part program step $V_1$, $R_1$, $K_1$, the quantity of washing liquid used for the relevant part program step is successively reduced during the relevant part program step. As a result of successive pumping-out of washing liquid and the alternating operation of the recirculation pump and the lye pump without any intermediate supply of fresh water until the washing liquid is substantially completely pumped out from the dishwasher, it can be ensured that the washing residues accumulated during the part program step are substantially completely released from the filter system and conveyed from the dishwasher before the next part program step of the wash program or a new wash program begins.

Figure 3:
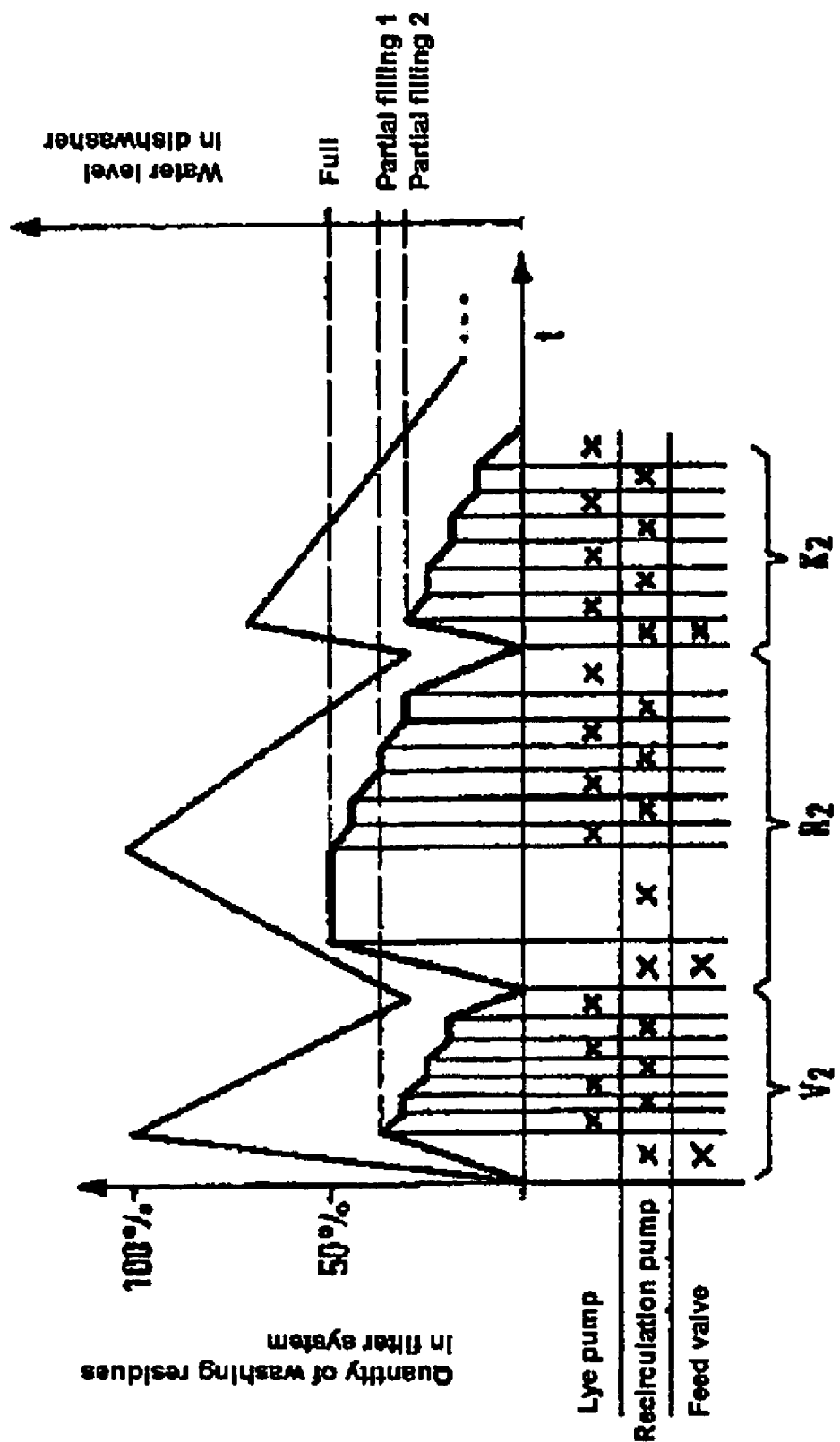
FIG. 3 is a diagram showing the occurrence of washing residues in the filter system in relation to the filling level of the washing liquid in the dishwasher, the operation of the lye pump, the recirculation pump and the feed valve in a method for operating dishwasher according to the present invention according to a second preferred embodiment.

FIG. 3 is a diagram showing the occurrence of washing residues in the filter system in relation to the filling level of the washing liquid in the dishwasher, the operation of the lye pump, the recirculation pump and the feed valve in a method for operating dishwasher according to the present invention according to a second preferred embodiment. In the diagram in FIG. 3 the time t is plotted on the X axis and the quantity of washing residues in the washing liquid from 0% to 100% is plotted on the Y axis. The diagram in FIG. 3 contains a first curve which shows the time behaviour of the filling level of the washing liquid in the dishwasher and a second curve which shows the time behaviour of the quantity of washing residues in the filter system in the course of the washing program of a dishwasher according to the present invention according to a second preferred embodiment.

In some features, the method for operating a dishwasher according to the present invention shown in FIG. 3 corresponds to that shown in FIG. 2. The wash program in this second embodiment again comprises three part program steps, such as pre-wash $V_2$, clean $R_2$ and clear rinse $K_2$, the individual part program steps $V_2$, $R_2$, $K_2$ being subdivided into a plurality of subsections by vertical lines. In the course of the part program steps $V_2$, $R_2$, $K_2$, the lye pump, recirculation pump and feed valve of the dishwasher can be activated or opened or deactivated or closed according to the program sequence. The operation of the lye pump, the recirculation pump and the feed valve is indicated in each case by crosses (X) in a matrix in the lower part of the diagram which is formed by the perpendicular lines for subdividing the subsections of the part program steps $V_2$, $R_2$, $K_2$ and the horizontal lines for distinguishing the operation of the lye pump, the recirculation pump and the feed valve. A cross in the lye pump line indicates operation of the lye pump and therefore pumping out within the relevant subsection of the part program step $V_2$, $R_2$, $K_2$. A cross in the recirculation pump line indicates operation of the recirculation pump and therefore circulation within the relevant subsection of the part program step $V_2$, $R_2$, $K_2$. A cross in the feed valve line indicates that the feed valve is open and thus fresh water is supplied to the dishwasher during the relevant subsection of the part program step $V_2$, $R_2$, $K_2$, the feed valve being closed at all other times and no fresh water being supplied.

The method shown in FIG. 3 begins, in the same way as the method shown in FIG. 2, in the part program step pre-wash $V_2$, with simultaneous operation of the recirculation pump and the feed valve. Likewise, the part program steps clean $R_2$ and clear rinse $K_2$ begin with the simultaneous operation of the recirculation pump and the feed valve. That is, the dishwasher is operated so that the recirculation pump is operated at least temporarily during the admission of the washing liquid used for the pre-wash process $V_2$, the cleaning process $R_2$ or the clear rinse process $K_2$. During the admission of washing liquid into the dishwasher, the washing liquid required for a wash process, is not yet completely introduced into the dishwasher, which has the effect described above with reference to FIG. 2. This effect is intensified in the second embodiment of the method according to the invention shown in FIG. 3 whereby the filling level of the washing liquid in the dishwasher only goes as far as a partial filling 1 during the pre-wash process $V_2$ and only as far as a partial filling 2 during the clear rinse process $K_2$, the partial filling 1 corresponding to about 70-80% of the maximum filling level of the washing liquid in the dishwasher and the partial filling 2 corresponding to about 60-70% of the maximum filling level of the washing liquid in the dishwasher.

At the beginning of each part program step $V_2$, $R_2$, $K_2$ using washing liquid, the washing residues are released relatively rapidly from the items to be washed, resulting in an increase in the quantity of washing residues in the washing liquid and in the filter system, In the further course of the part program steps $V_2$, $R_2$, $K_2$ the lye pump and the recirculation pump are operated alternately, that is circulating operation and pumping out alternate with one another. As a result of the intermittent use of the lye pump during the pre-wash process $V_2$, during the cleaning process $R_2$, and during the clear rinse process $K_2$, the filling level of the washing liquid in the dishwasher is reduced in steps from the respective highest level (full, partial filling 1, partial filling 2). As a result, the accumulated washing residues are removed from the filter system early on during the cleaning phases and are carried away from the dishwasher. This effect is shown by the curve giving the quantity of washing residues in the filter system which in each case descends in the last part of a part program step $V_2$, $R_2$, $K_2$. As described above, the dishwasher filter system is thereby automatically cleaned before the filter systems can become overloaded.

Figure 4:
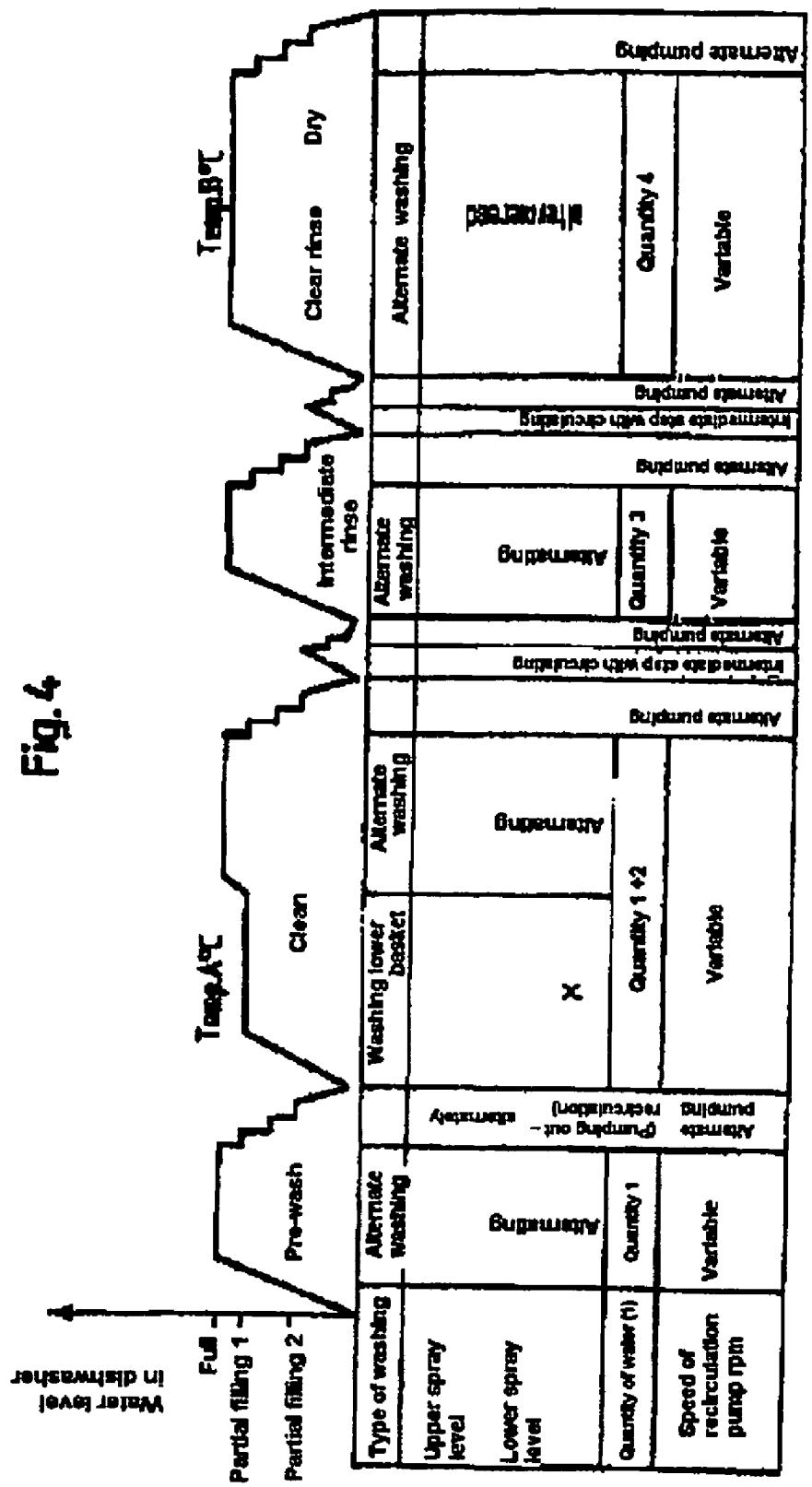
FIG. 4 is a schematic diagram of a method for operating a dishwasher according to the present invention according to a third preferred embodiment.

FIG. 4 is a schematic diagram of a method for operating a dishwasher according to the present invention according to a third preferred embodiment. A curve giving the time behaviour of the filling level of the washing liquid in the dishwasher in the course of the wash program according to a third embodiment of the present invention is plotted in the upper part of FIG. 4. In the third embodiment of the method according to the invention shown in FIG. 4, during the pre-wash, cleaning, intermediate rinse and clear rinse processes the filling level of the washing liquid in the dishwasher is filled as far as the maximum filling level of the washing liquid in the dishwasher and in the final phase of each part program section it is gradually reduced until the dishwasher is completely empty. Only in the part program step "clean" does the filling level initially only go up to a level "partial filling 1", which corresponds to 80-90% of the maximum filling level of the washing liquid in the dishwasher and the washing liquid is only filled to the maximum level of the washing liquid in the dishwasher in a second phase of the part program step "clean".

At the beginning of each part program step using washing liquid, the washing residues are released relatively rapidly from the items to be washed, resulting in an increase in the quantity of washing residues in the washing liquid and in the filter system. At the end of the part program steps "pre-wash", "clean", "intermediate rinse" and "clear rinse" the lye pump and the recirculation pump are operated alternately, that is circulating operation and pumping out alternate with one another. As a result of the intermittent use of the lye pump during the part program steps, the filling level of the washing liquid in the dishwasher is reduced in steps from the respective highest level (full) until the dishwasher is completely emptied. As a result, the accumulated washing residues are removed from the filter system early on during the cleaning phases of the wash program and are carried away from the dishwasher. This effect is shown by the curve giving the quantity of washing residues in the filter system which in each case descends in the last part of the part program steps.

The dishwasher suitable for executing this embodiment has the special feature that a plurality of spray devices are provided for an upper and a spray level which can be supplied simultaneously or alternately with washing liquid by the recirculation pump. In addition, this dishwasher has a recirculation pump which can be operated at different conveying capacity. Furthermore, since separate washing liquid lines are provided from the recirculation pump to the individual spray devices, the washing liquid can be conveyed by the recirculation pump to the individual spray devices at different conveying capacity. As a result, water jets of different intensity can be produced inside a storage container at different spray levels depending on the sensitivity of the items to be washed.

The method for operating a dishwasher according to the embodiment shown in FIG. 4 consists of the part program steps pre-wash, clean, intermediate rinse, clear rinse and dry. During the pre-wash phase with a quantity of water 1, the recirculation pump is operated at variable capacity, in some cases below the maximum, whilst the upper spray level and the lower spray level are alternately activated. The method shown in FIG. 4 thus has the advantage that the action of the water jet on the items to be washed by the spray devices is not always at maximum intensity but at reduced or variable intensity and from alternating spray levels. This has the advantage that peak occurrences of washing residues in the washing liquid, especially during the pre-wash phase are stretched over a longer time interval so that the filter systems in the dishwasher are not overloaded and the cleaning effects are sufficient to preserve the functionality of the filter systems.

The pre-wash process is followed by an intermediate process using alternate pumps where the lye pump and the recirculation pump are operated alternately, that is circulating operation and pumping out alternate with one another. As a result, the accumulating washing residues are removed early on from the filter system and the dishwasher especially during the cleaning phases of the wash program. This effect is shown by the curve giving the quantity of washing residues in the washing liquid which descends gradually during the intermediate process using alternate pumps. As described above, the filter system of the dishwasher is cleaned automatically.

The intermediate process using alternate pumps is followed by the main cleaning process during which the temperature is increased from a temperature A to a temperature B. During the main cleaning process the recirculation pump is operated at variable capacity and the spray levels are supplied with washing liquid so that they are alternately activated. The main cleaning process is again followed by an intermediate process using alternate pumps where the lye pump and the recirculation pump are operated alternately. In this case, washing residues accumulated in the main cleaning process are removed from the filter system and carried out of the dishwasher.

Finally, an intermediate step can be inserted where only a small quantity of washing liquid is circulated preferably by means of both spray devices. This can be followed by an intermediate process with alternate pumps. As a result of these intermediate steps, washing residues are largely completely removed from the dishwasher. As can be seen from FIG. 4, further part program steps can also follow, where these part program steps can differ in some details, such as the quantity of washing liquid used for the respective washing solution, the conveying capacity of the recirculation pump and fixed spray nozzles and the operating duration of the individual spray devices. Advantageously in the embodiment of the method according to the invention shown in FIG. 4, the washing liquid is completely pumped out and thus the washing solution is completely exchanged at the end of each part program step and at the end of the intermediate steps using alternate pumps.

REFERENCE LIST

1 Coarse filter
2 Fine filter
3 Fine filter cylinder
4 Micro-cylinder
5
A Direction of washing liquid flow during pumping out (pumping out direction)
U Direction of washing liquid flow during recirculating operation (recirculating direction)

The invention claimed is:

1. A method for operating a dishwasher comprising at least one washing container, a washing fluid filter system having a filter surface, a re-circulation pump for conveying the washing fluid in a first flow direction through the filter surface of the washing fluid filter system to at least one spray device for acting upon items to be cleaned, which are located in the washing container, a lye pump for pumping away the washing liquid from the dishwasher in a second flow direction through the filter surface of the washing fluid filter system, wherein the second flow direction through the filter surface is opposite to the first flow direction through the filter surface, the method comprising:
    executing a wash program at least including partial program steps pre-wash ($V_1$, $V_2$), clean ($R_1$, $R_2$), intermediate rinse, clear rinse ($K_1$, $K_2$) and dry, and cleaning the filter surface of the washing fluid filter system by operating the re-circulation pump and the lye pump at least temporarily in an alternating manner during at least one of the partial program steps ($V_1$, $V_2$, $R_1$, $R_2$, $K_1$, $K_2$) such that the washing fluid is conveyed by the re-circulation pump in the first flow direction through the filter surface of the washing fluid filter system to the at least one spray device, and the washing fluid subsequently is conveyed by the lye pump in the second flow direction through the filter surface of the washing fluid filter system to wash away washing residue from the filter surface of the washing fluid filter system and carry the washing residue out of the dishwasher.

2. The method according to claim 1, further comprising:
operating the re-circulation pump and the lye pump simultaneously at least temporarily during the at least one partial program step ($V_1$, $V_2$, $R_1$, $R_2$, $K_1$, $K_2$).

3. The method according to claim 1, further comprising:
supplying fresh water to the washing container at least temporarily during the at least one partial program step ($V_1$, $V_2$, $R_1$, $R_2$, $K_1$, $K_2$).

4. The method according to claim 1, further comprising:
during operation of the re-circulation pump, simultaneously opening a feed valve at least temporarily in order to admit fresh water into the dishwasher.

5. The method according to claim 1, further comprising:
operating the re-circulation pump at least temporarily during admission of the washing liquid used for the at least one partial program step ($V_1$, $V_2$, $R_1$, $R_2$, $K_1$, $K_2$) into the dishwasher.

6. The method according to claim 1, further comprising:
during operation of the lye pump, simultaneously opening a feed valve at least temporarily in order to admit fresh water into the dishwasher.

7. The method according to claim 1, further comprising:
during the at least one partial program step ($V_1$, $V_2$, $R_1$, $R_2$, $K_1$, $K_2$), removing washing liquid at least temporarily from the dishwasher via the lye pump.

8. The method according to claim 1, further comprising:
successively reducing a quantity of washing liquid used for one of the partial program steps ($V_1$, $V_2$, $R_1$, $R_2$, $K_1$, $K_2$) during the relevant partial program step ($V_1$, $V_2$, $R_1$, $R_2$, $K_1$, $K_2$).

9. The method according to claim 1, further comprising:
in a course of the at least one partial program step ($V_1$, $V_2$, $R_1$, $R_2$, $K_1$, $K_2$), substantially completely removing the washing liquid from the dishwasher using the lye pump.

10. The method according to claim 1, further comprising:
after each of the partial program steps ($V_1$, $V_2$, $R_1$, $R_2$, $K_1$, $K_2$) using washing liquid, substantially completely changing the washing liquid.

11. The method according to claim 1, further comprising:
varying one of a speed and a capacity of the re-circulation pump for conveying washing liquid.

12. A dishwasher comprising at least one washing container, a washing fluid filter system having a filter surface, a re-circulation pump for conveying the washing fluid in a first flow direction through the filter surface of the washing fluid filter system to at least one spray device for acting upon items to be cleaned, which are located in the washing container, a lye pump for pumping away the washing liquid from the dishwasher in a second flow direction through the filter surface of the washing fluid filter system, wherein the second flow direction through the filter surface is opposite to the first flow direction through the filter surface, and a program controller for controlling operation of the at least one washing container, the washing fluid filter system, the re-circulation pump, and the lye pump, the program controller programmed to execute a wash program, the wash program; at least including partial program steps pre-wash ($V_1$, $V_2$), clean ($R_1$, $R_2$), intermediate rinse, clear rinse ($K_1$, $K_2$) and dry, and a cleaning step to clean the filter surface of the washing fluid filter system by operating the re-circulation pump and the lye pump at least temporarily in an alternating manner during at least one of the partial program steps ($V_1$, $V_2$, $R_1$, $R_2$, $K_1$, $K_2$) such that the washing fluid is conveyed by the re-circulation pump in the first flow direction through the filter surface of the washing fluid filter system to the at least one spray device, and the washing fluid subsequently is conveyed by the lye pump in the second flow direction through the filter surface of the washing fluid filter system to wash away washing residue from the filter surface of the washing fluid filter system and carry the washing residue out of the dishwasher.

13. The dishwasher according to claim 12, further comprising:
at least two spray devices that are one of supplied simultaneously and alternately with washing liquid by the re-circulation pump.

14. The dishwasher according to claim 13, wherein the washing liquid is conveyed by the re-circulation pump to the individual spray devices at different conveying capacity.

15. The method of claim 1, further comprising:
prior to the cleaning the filter surface of the washing fluid filter system during the at least one partial program step ($V_1$, $V_2$, $R_1$, $R_2$, $K_1$, $K_2$), temporarily operating the re-circulation pump while simultaneously admitting fresh water into the dishwasher by opening a feed valve.

16. The method of claim 1, further comprising:
subsequent to the cleaning the filter surface of the washing fluid filter system during the at least one partial program step ($V_1$, $V_2$, $R_1$, $R_2$, $K_1$, $K_2$), temporarily operating the re-circulation pump while simultaneously admitting fresh water into the dishwasher by opening a feed valve.

17. The method of claim 15, further comprising:
subsequent to the cleaning the filter surface of the washing fluid filter system during the at least one partial program step ($V_1$, $V_2$, $R_1$, $R_2$, $K_1$, $K_2$), temporarily operating the re-circulation pump while simultaneously admitting fresh water into the dishwasher by re-opening the feed valve.

18. The method of claim 1, further comprising:
cleaning the filter surface of the washing fluid filter system by operating the re-circulation pump and the lye pump a plurality of times in an alternating manner during the at least one of the partial program steps ($V_1$, $V_2$, $R_1$, $R_2$, $K_1$, $K_2$) such that the washing fluid is conveyed by the re-circulation pump in the first flow direction through the filter surface of the washing fluid filter system to the at least one spray device, the washing fluid subsequently is conveyed by the lye pump in the second flow direction through the filter surface of the washing fluid filter system to wash away a first portion of the washing residue from the filter surface of the washing fluid filter system and carry the first portion of the washing residue out of the dishwasher, the washing fluid subsequently is conveyed again by the re-circulation pump in the first flow direction through the filter surface of the washing fluid filter system to the at least one spray device, and the washing fluid subsequently is conveyed again by the lye pump in the second flow direction through the filter surface of the washing fluid filter system to wash away a second portion of the washing residue from the filter surface of the washing fluid filter system and carry the second portion of the washing residue out of the dishwasher.

19. The method of claim 1, wherein the cleaning the filter surface of the washing fluid filter system is performed during each of the partial program steps ($V_1$, $V_2$, $R_1$, $R_2$, $K_1$, $K_2$).

20. The method of claim 19, further comprising:
prior to the cleaning the filter surface of the washing fluid filter system during each of the partial program steps ($V_1$, $V_2$, $R_1$, $R_2$, $K_1$, $K_2$), temporarily operating the re-circulation pump while simultaneously admitting fresh water into the dishwasher by opening a feed valve.

21. The method of claim 19, further comprising:
during each of the partial program steps ($V_1$, $V_2$, $R_1$, $R_2$, $K_1$, $K_2$), temporarily operating the re-circulation pump and the lye pump simultaneously.

22. The method of claim 19, further comprising:
subsequent to the cleaning the filter surface of the washing fluid filter system during each of the partial program steps ($V_1$, $V_2$, $R_1$, $R_2$, $K_1$, $K_2$), temporarily operating the re-circulation pump while simultaneously admitting fresh water into the dishwasher by opening a feed valve.

23. The method of claim 20, further comprising:
subsequent to the cleaning the filter surface of the washing fluid filter system during each of the partial program steps ($V_1$, $V_2$, $R_1$, $R_2$, $K_1$, $K_2$), temporarily operating the re-circulation pump while simultaneously admitting fresh water into the dishwasher by re-opening the feed valve.

24. The method of claim 19, further comprising:
cleaning the filter surface of the washing fluid filter system by operating the re-circulation pump and the lye pump a plurality of times in an alternating manner during each of the partial program steps ($V_1, V_2, R_1, R_2, K_1, K_2$) such that the washing fluid is conveyed by the re-circulation pump in the first flow direction through the filter surface of the washing fluid filter system to the at least one spray device, the washing fluid subsequently is conveyed by the lye pump in the second flow direction through the filter surface of the washing fluid filter system to wash away a first portion of the washing residue from the filter surface of the washing fluid filter system and carry the first portion of the washing residue out of the dishwasher, the washing fluid subsequently is conveyed again by the re-circulation pump in the first flow direction through the filter surface of the washing fluid filter system to the at least one spray device, and the washing fluid subsequently is conveyed again by the lye pump in the second flow direction through the filter surface of the washing fluid filter system to wash away a second portion of the washing residue from the filter surface of the washing fluid filter system and carry the second portion of the washing residue out of the dishwasher.

25. The method of claim 19, further comprising:
successively decreasing a quantity of washing liquid used for partial program step ($R_1, R_2$), wherein the partial program step ($R_1, R_2$) is subsequent to the partial program step ($V_1, V_2$).

26. The method of claim 19, further comprising:
successively decreasing a quantity of washing liquid used for partial program step ($K_1, K_2$) compared to partial program step ($R_1, R_2$), wherein the partial program step ($K_1, K_2$) is subsequent to the partial program step ($R_1, R_2$).

27. The method of claim 19, prior to the cleaning the filter surface of the washing fluid filter system during each of the partial program steps ($V_1, V_2, R_1, R_2, K_1, K_2$), filling the washing container to a maximum filling level.

28. The method of claim 1, subsequent to the cleaning the filter surface of the washing fluid filter system during the at least one partial program step ($V_1, V_2, R_1, R_2, K_1, K_2$), filling the washing container to a maximum filling level.

* * * * *